INVENTORS:
WILLBURT W. SCHROEDTER
RICHARD D. HOTTENSTINE

BY *Arthur O. Firl*

AGENT

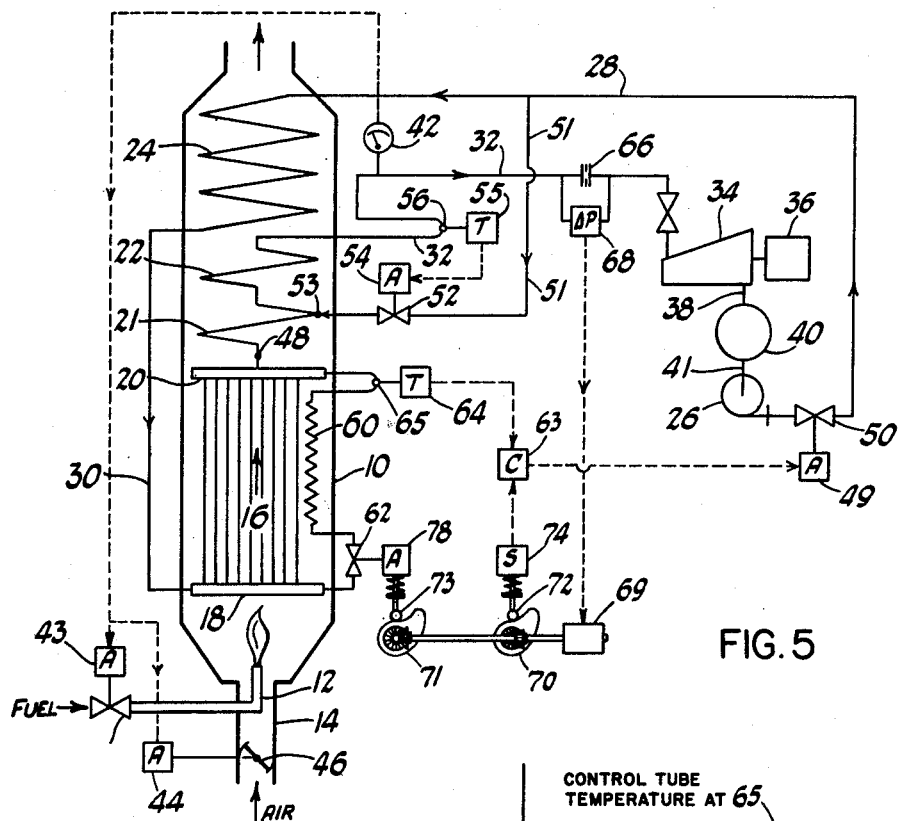
FIG. 5
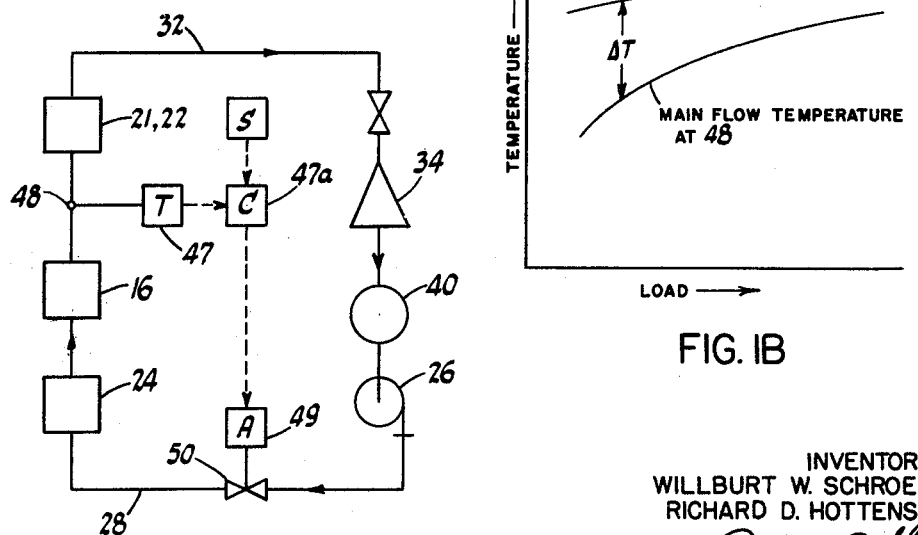
FIG. 1A
FIG. 1B
INVENTORS:
WILLBURT W. SCHROEDTER
RICHARD D. HOTTENSTINE
BY
AGENT

INVENTORS:
WILLBURT W. SCHROEDTER
RICHARD D. HOTTENSTINE

BY Arthur C. Firl

AGENT

June 15, 1965 W. W. SCHROEDTER ETAL 3,189,008
METHOD AND APPARATUS FOR CONTROLLING A VAPOR GENERATOR
OPERATING AT SUPERCRITICAL PRESSURE
Filed Aug. 21, 1963 4 Sheets-Sheet 4

LEGENDS

- ΔP  FLOW INDICATOR
- A   POWER UNIT
- D   DIFFERENTIATING DEVICE
- C   COMPARING DEVICE
- S   SETPOINT INDICATOR
- T   TEMPERATURE SENSOR
- P   PRESSURE SENSOR

INVENTORS:
WILLBURT W. SCHROEDTER
RICHARD D. HOTTENSTINE
BY

AGENT

United States Patent Office 3,189,008
Patented June 15, 1965

3,189,008
METHOD AND APPARATUS FOR CONTROLLING A VAPOR GENERATOR OPERATING AT SUPERCRITICAL PRESSURE
Willburt W. Schroedter, West Hartford, and Richard D. Hottenstine, Windsor, Conn., assignors to Combustion Engineering, Inc., Windsor, Conn., a corporation of Delaware
Filed Aug. 21, 1963, Ser. No. 303,581
8 Claims. (Cl. 122—451.1)

The invention relates to a forced-flow vapor generator operating in the supercritical pressure range and to a method and system for controlling the operation thereof. More particularly the invention is concerned with an improved method and an improved arrangement of devices for controlling the feedwater flow to a forced-flow vapor generator when producing superheated vapor at a pressure above the critical pressure, which in the case of water and steam is 3,206.2 p.s.i.a. (pounds per square inch absolute).

In a vapor generator equipped with a vapor and liquid drum a relatively large reservoir of liquid is generally available. When operating a boiler of this type with natural circulation an increase in firing rate produces an increase in circulation of the fluid through the heated tubes. In a boiler operating with controlled circulation a pump is provided to give adequate fluid flow for maximum heat absorption in the boiler. In a forced-flow vapor generator however the fluid flow through the heated tubes only depends on the fluid or liquid quantity entering the boiler which must be closely regulated to match the firing rate or heat input.

Although vapor generating systems of the forced flow type have been widely used when operated at subcritical pressures, their use at supercritical pressures has been limited due to the problems encountered in handling working fluids at such pressures. To elaborate, a fluid at a supercritical pressure behaves as a single phase fluid, and, as it is heated it exhibits a smooth transition from what may be termed a liquid to what may be termed a vapor. Nothing akin to evaporation occurs. Thus, there is no point during the heating of a fluid at a supercritical pressure at which a "vapor" and a "liquid" exist together; there is no point at which the temperature does not increase or decrease as heat is added or subtracted; and the specific volume of the fluid always changes as the temperature changes. There is a region, however, in which the specific heat of the fluid begins to decrease or increase rapidly as heat is added or subtracted, respectively, and this region has been called the "transition zone" of the working fluid.

In one control system commonly adapted for a vapor generator operating in the supercritical pressure range, the fluid flow to the generator is regulated in response to temperature variation impulses of the heated fluid. For this purpose, a temperature sensing device is employed which responds to temperature variations of the working fluid leaving the furnace wall surface or transition zone surface of the vapor generator.

One important requirement for the location of the temperature sensing point along the path of the fluid being heated is that the temperature range covered will indicate variations in heat absorption or heat input by recording corresponding variations in temperature that are of relatively wide magnitude.

Another important requirement governing the location of the control point where temperature measurements are taken is that this point be located sufficiently close to the fluid flow regulator that is activated by the temperature sensing device, so that the inherent inertia of the traversed heating surfaces and the time lag in the control circuit still permits a sufficient speedy control response.

And a third requirement in connection with the location of the control point is that, while satisfying the first and second conditions, the control temperature should not be located at a too high temperature level, which may necessitate the by-passing of excessive amounts of injection water for superheat temperature control.

It is accordingly a primary object of the invention to provide in a supercritical pressure boiler a fluid flow control system and method utilizing temperature impulses which give a quick and nearly immediate indication of the variations in heat absorption or heat input and which maintain a highly uniform accuracy and sensitivity throughout a wide load range or fluid pressure range, without requiring excessive amounts of injection water for superheat temperature control.

Other objects and advantages of the invention will become apparent from the following description of an illustrative embodiment thereof, such embodiment taking the form of a steam generator operating in the supercritical pressure range of between 3,400 and 4,400 p.s.i.a. The description proceds in conjunction with the accompanying drawings wherein:

FIG. 1A is a diagram of a steam generator showing a basic conventional feedwater control system.

FIG. 1B is a plot showing control tube temperature and main flow temperature plotted against load.

Figure 2:
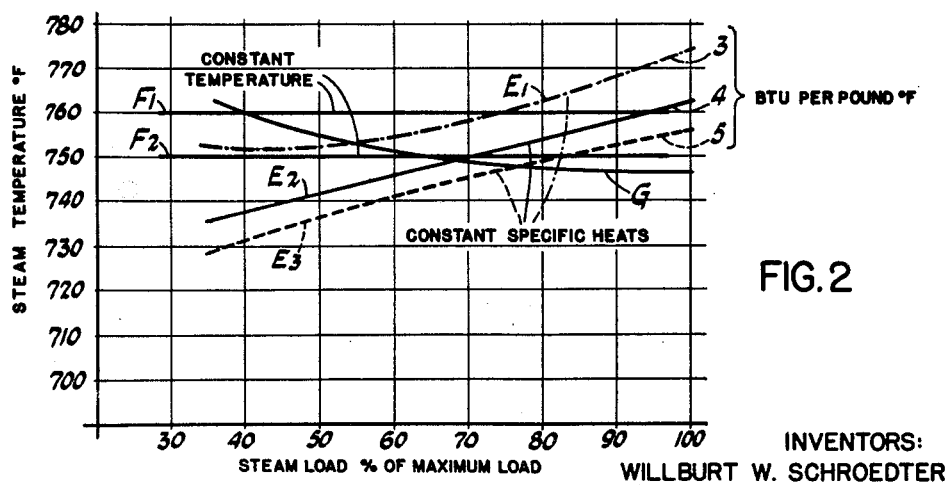

FIG. 2 is a diagram showing a group of characteristic control curves as plotted against fluid temperature and load of a steam generator operating at variable steam loads and delivering steam to a turbine at a throttle pressure of 3,500 p.s.i.; three curves ($E_1$, $E_2$, $E_3$) defining a constant specific heat relation throughout the load range, two curves ($F_1$, $F_2$) defining a constant temperature relation, and one curve (G) representing any desired relationship between control temperature and load.

Figure 3:
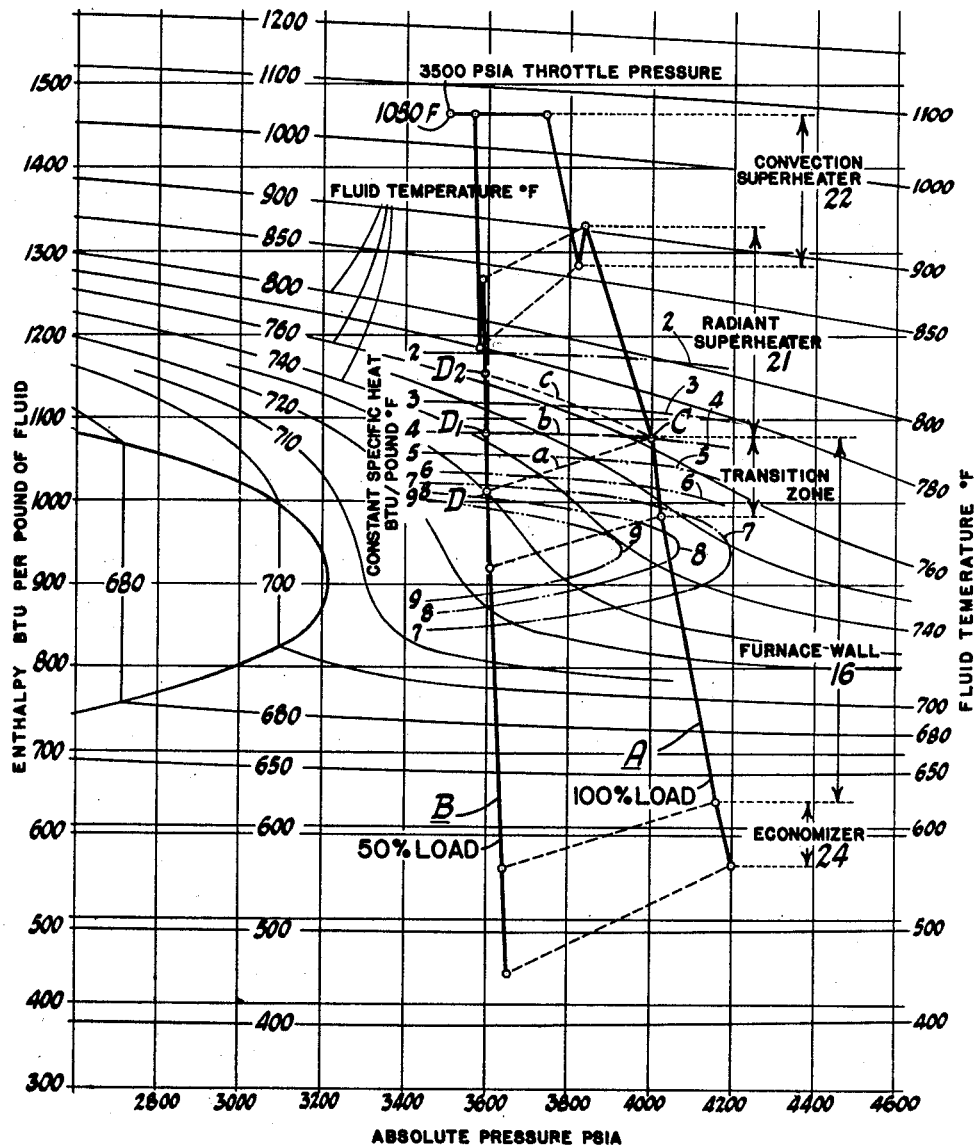

FIG. 3 is a portion of the enthalpy diagram for steam and water showing a superimposed plot of the performance of the steam generator operating at 100% and 50% of maximum load and at a supercritical pressure of 3,500 p.s.i.a. at the turbine throttle. Also constant specific heat curves are plotted on this diagram within the area of interest.

Figure 1:
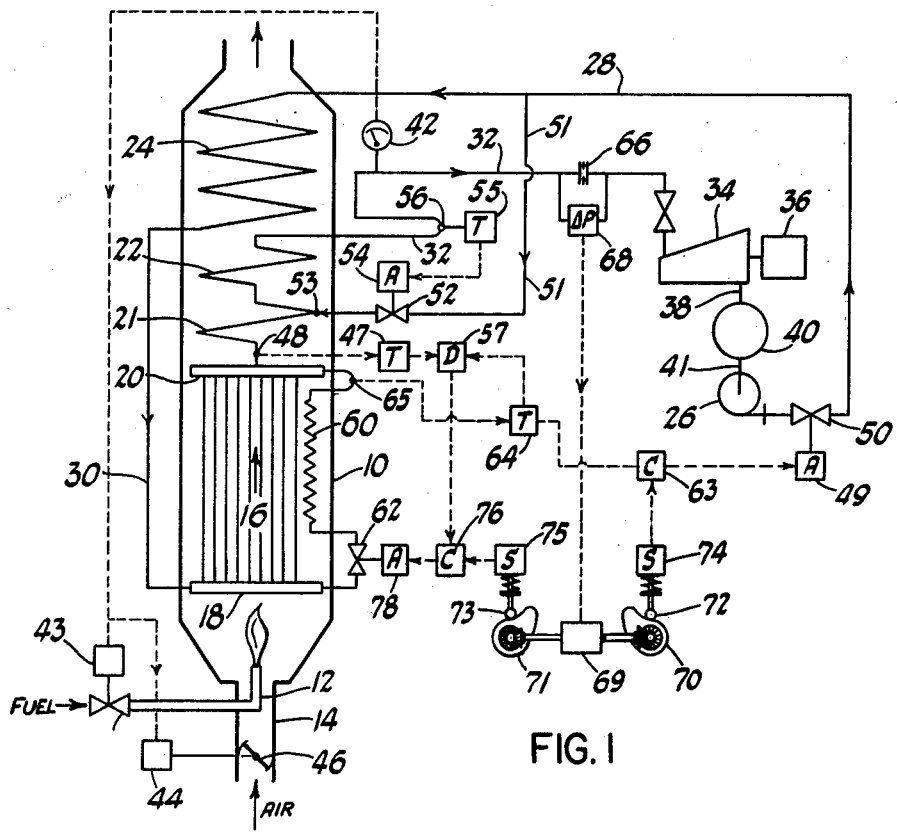
FIG. 1 is a diagram representing a steam generator operating in the supercritical pressure range and employing the novel preferred feedwater control apparatus and method disclosed by the invention, and wherein a temperature differential value furnishes one control impulse.
Figure 4:
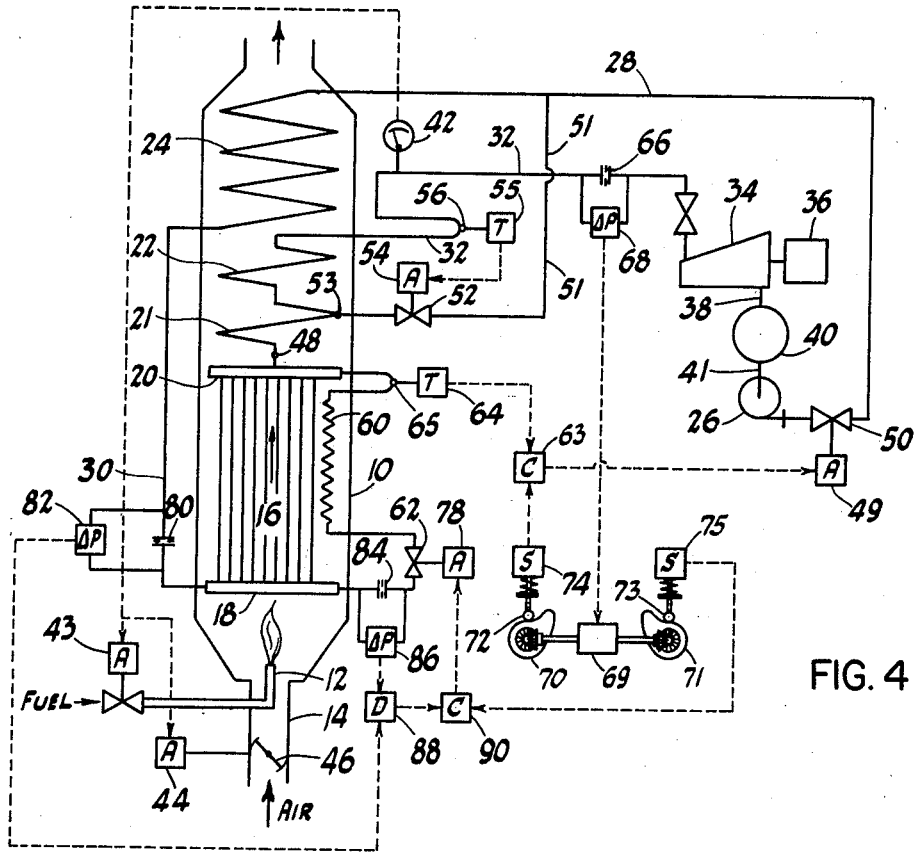

FIGS. 4 and 5 are diagrams representing steam generators similar to that shown in FIG. 1, however being equipped with alternate embodiments of the herein disclosed control system. Thus in FIG. 4 a system is shown wherein one control impulse is received from a differential of control tube flow and main flow, and in FIG. 5 a system is shown wherein one control impulse is received from an indication of the difference in valve positioning.

Figure 4A:
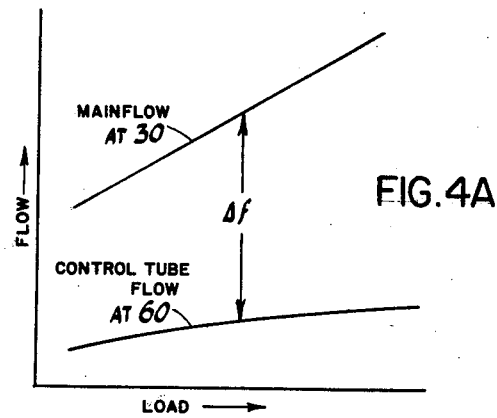

FIG. 4A is a plot showing main flow and flow through control tube plotted against load.

In the steam generator diagrammatically depicted in FIG. 1, combustion elements such as fuel and air are introduced into the furnace chamber 10 by way of fuel burner 12 and air inlet duct 14. The walls of chamber 10 are lined with water carrying and steam generating tubes which in the diagrammatic illustration of FIG. 1 are represented by tubes 16 which may terminate in an inlet conduit 18 and an outlet conduit 20. In passing through chamber 10 the hot combustion gases give up heat to furnace tubes 16, to a superheater 21, a convection superheater 22 and to an economizer 24. Other conventional heat absorbing surfaces such as a steam reheater or an air heater, not shown, may be placed in the path of the combustion gases on their way to a stack, not shown.

In operating the steam generator economizer 24 receives feedwater or working fluid of a relatively low temperature by way of a feed pump 26 and feed pipe 28. After heating the fluid in the economizer 24 to a suitable temperature, the fluid flows via pipe 30 and inlet conduit 18 into furnace tubes 16 for further heating and ultimate transition into steam. After passing through outlet conduit 20, additional heating of the working fluid to a predetermined desired temperature takes place in radiant superheater 21 and convection superheater 22, from whence the steam is delivered by way of steam pipe 32 to a point of use such as steam turbine 34 driving an electric generator 36. Having given up its energy by expansion in turbine 34 the steam is exhausted therefrom by way of conduit 38 into condenser 40, from whence the condensate is delivered to the inlet of feed pump 26 by way of conduit 41, thereby completing the once-through steam producing cycle.

Control of the generation of steam has been accomplished in many different ways, with control systems being made up of basic conventional elements. These elements include primary elements that respond to changes in conditions, steam pressure for example; relaying equipment that converts these responses to some form of controlling impulse and transmits them to points where control is supplied; and power units that receive the control impulses and provide the force to move dampers, adjust rheostats, throttle valves and the like.

The invention disclosed herein makes use of these basic control elements well known in the art. Accordingly inclusion herein of a detailed description of these conventional devices is not considered to be necessary. However such control elements may be of the type that are described and illustrated in greater detail in "Combustion Control" by B. G. A. Skortzki as published in "Power" of December 1949.

Control of the generation of steam may be accomplished by varying the firing rate in response to turbine load demand or other system load requirement. Thus, variations in steam demand or turbine load will be reflected in the steam pressure prevailing in steam pipe 32 as indicated by steam gauge 42. A momentary drop in steam pressure due to a greater demand of steam is transmitted from pressure sensing device 42 to activating devices or power units 43 and 44 and causes fuel regulating device such as fuel valve or fuel feeder 45 and air damper 46 to admit more fuel and air into chamber 10. Conversely a rise in steam pressure will cause a diminishing of fuel and air flow to chamber 10 in a manner well known in the art. Other conventional means for regulating the fuel supply in response to load demand may be used such as those described and illustrated in the above-mentioned article "Combustion Control."

Having adjusted the fuel and air supply to load requirements in this manner the working fluid flow must now be adjusted to the firing rate or heat input so as to maintain a sufficient working fluid supply at different loads. As earlier mentioned herein and as shown in FIG. 1A this has heretofore been accomplished in the art by a temperature sensing device such as 47 which being subject to the temperature prevailing at point 48 in the outlet conduit of all the tubes 16, transmits an impulse to a comparing device 47a wherein the measured temperature is compared with a standard or set point control temperature, with any deviation therefrom resulting in a corresponding adjustment of the feedwater regulator 49 and valve 50. In this manner a feedwater flow is established which will maintain a predetermined fluid temperature at the control point 48.

Having provided an adequate supply of feedwater, fuel and air to satisfy the steam demand, it also becomes necessary to control the temperature of the steam as it enters the steam turbine 34. One conventional way of accomplishing this is by injecting a variable quantity of relatively cool water into the steam flow in response to temperature variations obtained at a point in the steam flow between the superheater outlet and the turbine. Thus, in the embodiment illustrated in FIG. 1 a pipe 51 is provided for conducting water from the feedwater pipe 28 to an injection valve 52 for the purpose of injecting this water into the steam flow at a point 53 in the superheater 21. The amount of water injected is determined by adjusting injection valve 52 by means of activator 54 in response to a temperature sensing device 55 receiving temperature variations of the steam leaving the superheater 22 at point 56. In this manner, a desired temperature is maintained of the steam leaving the superheater 22 and entering the turbine 34 at various steam generating loads.

In steam boilers operating at a pressure above the critical pressure and to which the invention is particularly applicable, separation between steam and water does not occur and a saturation temperature does not exist, and the temperature of the fluid always changes with change in heat input. Furthermore, the temperature sensing device 47 responds to the temperature change of the total flow of fluid leaving the furnace wall tubes 16 or transition zone surface.

In the design of these steam generators operating at supercritical pressure, great difficulties had been experienced in satisfying the three primary requirements earlier herein set forth with respect to the location of the control point 48 and temperature sensing device 47. It was found that when the control point 48 is located in the fluid heating path at a location sufficiently close to the feedwater control valve 50 to satisfy the second or "quick response" condition, it would be difficult if not impossible throughout the desired load range to meet the first condition namely that of obtaining temperature variations of sufficiently wide magnitude and sensitivity for corresponding heat input variations. In order to meet the second or "quick response" condition, the sensing point 48 should be located in or near the transition zone of the supercritical fluid. In this zone however the enthalpy change is accompanied by a substantial change in specific volume and only a minor change in temperature, due to the high instantaneous specific heat in that zone which results in a reduced sensitivity of the control response. This is especially true in the supercritical pressure range immediately above the critical pressure point. The problem of choosing an appropriate location for the control point 48 and temperature sensing device 47 is therefore more acute in boilers operating at 3,500 p.s.i. throttle pressure than in those operating at 5,000 p.s.i. throttle pressure.

Attempts have been made to raise the temperature level at the location of the sensing device control point 48 in the fluid heating path which would satisfy the second or "quick response" condition in sufficient amounts to reach a zone of lower specific heat and thereby better satisfy the first or "wide magnitude temperature change" requirement. This may be accomplished by increasing the water injection flow at 53 into the steam leaving the superheater 22. Such flow will bypass the heating surfaces 24, 16 and 21 upstream of the temperature control point 48 and accordingly by raising the temperature of the fluid at the control point 48, bring the control point into a more favorable specific heat region. Such increase of the amount of injection water however proved to be undesirable, since it reduces the over-all efficiency of the unit and increases the size of the injection valve 52, of piping 51 and of the heating surface of economizer 24.

It may be possible to find a location for the control point 48 which would satisfy both the first and the second of the above requirements reasonably well under full load operating conditions, with only a moderate amount of injection water being by-passed for adequate superheat temperature control. However, when the steam load on the generator is reduced to a fraction of maximum load, the problem of control under lower load conditions becomes greatly aggravated and calls for a radical departure from the control methods as heretofore practiced in connection with boilers operating in the supercritical pressure range. For if the control temperature were reset at these lower loads so that only a moderate amount of injection water would be by-passed, then these temperatures would fall into a region of extremely high specific heats which would make the feedwater control insensitive to changes in heat absorption.

The above conditions are illustrated in FIG. 3, which shows two curves A and B superimposed upon the enthalpy diagram for steam and water, and indicating performance conditions at 100% maximum load and 50% maximum load of a steam boiler operating at a turbine throttle pressure of 3,500 p.s.i.a. There are also shown on this diagram a series of constant specific heat curves from 2 to 9 B.t.u./lb.° F.

The right hand curve A indicates the enthalpy, pressures and temperatures through which the fluid is passing from the inlet of the economizer 24 to the outlet of the convection superheater section 22, when the unit is operating at maximum load. It will be noted that the fluid temperature at the outlet of the transition zone, see point C, is approximately 762° F. at a pressure of approximately 4,000 p.s.i.a, which corresponds to a specific heat of about 4 B.t.u. per pound degree F. This is a desirable location of the control point 48 (see FIG. 1) both with respect to the first condition requiring a large temperature change for a relatively small heat input change, and also with respect to the second or "quick response" condition. Furthermore, the temperature of 762° F. results in a superheater outlet temperature which requires a moderate amount, such as 5%, of injection water at point 53 (see FIG. 1) in order to obtain a superheated steam temperature of, for example, 1,050° F. at the turbine throttle.

The left hand curve B shows similar conditions when the boiler is operating at 50% of maximum load. With the location of the control point 48, see FIG. 1, being maintained at the transition zone outlet throughout variations in load, it would follow line "a" (see FIG. 3) and would reach point D which is characterized by a temperature of approximately 730° F. at a pressure of 3,600 p.s.i.a. However, this temperature would not only require the by-passing of approximately 15% of the feedwater flow for injection purposes in order to maintain a superheated steam temperature of 1,050° F., but the control point would now be located in a region having a specific heat of 7.5 B.t.u. per lb. degree F. Therefore, the responses of the control elements would only be approximately one-half at 50% load than they are at 100% load, in addition to requiring a considerably larger set of injection valves, larger piping and more extensive economizer heating surface.

If, on the other hand, it were desired to reset the location of the control point by changing the amount of injection water, or by other means, so that a specific heat value is maintained throughout the load range which is equal to that obtained at maximum load, such control temperature would then follow line "b" with a temperature of 742° F. at 50% load as indicated by point $D_1$. This however would require at this load an amount of injection water for superheat control which would be in the neighborhood of 25% of total flow. Accordingly, when operating at 50% load, only 37½% of the flow leaving the unit at top load would now pass through the furnace tubes 16 and the transition zone. Since a minimum flow of 30% is required through these heating surfaces to maintain stability of flow, the above high percentage of injection water would make it impossible to operate the steam generator at an output of 30% which is the minimum load design condition conventionally required.

To overcome the above difficulties the invention provides that one or several of the tubes 16 be used as a control element 60 (see FIG. 1), with the heat absorbed by this element being proportional to that absorbed by the remaining tubes. A conventional fluid flow controlling device such as valve 62 is employed in connection with control element or tube 60 for regulating the fluid flow therethrough independently from the fluid flow through the remaining tubes 16. A temperature sensing device 64 is provided near the outlet of tube 60 for receiving temperature variations occurring at a point 65 of tube 60, before the fluid flowing through tubes 60 rejoins the fluid that has passed through the main body of tubes 16. In accordance with the invention temperature sensing device 64 performs basically the same function as that performed by temperature sensing device 47 which, as shown in FIG. 1A, had been used in adjusting feedwater valve 50 by means of feed-water regulator 49, and comparing device 63 matches the measured temperature with a standard control temperature, similar to the function performed by controller 47a, see FIG. 1A. It should be noted however that, whereas temperature sensing device 47 measured temperature variations of the total flow of fluid flowing through all the furnace wall tubes 16, temperature sensing device 64, in contrast thereto, records temperature variations occurring only in control element or tube 60.

When regulating a steam generator operating in the supercritical pressure range over a wide load range as, for example, from 100 percent maximum load down to 30 percent maximum load, the heating surfaces are generally so proportioned during the design stage, that the calculated temperature of the fluid passing through all the tubes 16 at the control point 48 would fall in a low specific heat range at top load, such as 3 or 4 B.t.u. per pound degree F. As the unit is operated at lower loads the temperature of the fluid at point 48 would automatically and normally fall to a lower temperature for each lower load, provided normal operating conditions prevail such as maintaining clean furnace walls free from slag, normal access air and normal firing conditions. Accordingly, once the designer had chosen the location of the control point such as at the end of the transition zone, as indicated in FIG. 3, and had decided on the amount of injection water to be used for steam temperature control, as earlier explained herein, the operation of the boiler then would be such as to only follow one temperature characteristic with respect to varying loads, such as from top load down to minimum load of 30 percent. As pointed out hereinabove such preset and inherent control temperature characteristic would lead into a region of high specific heats when operating at low loads, making the feedwater control relatively insensitive to heat input, or, if redesign of the injection system is considered, requiring excessive amounts of injection water for superheated steam temperature regulation.

In accordance with the invention such rigid control temperature characteristic that normally would be predetermined and inherent in the generator design and in an established control point location, is now completely avoided. The problem of control in a steam generator operating in the supercritical pressure range has now been resolved by employing the herein disclosed most practical and flexible method, such method being capable of adaptation to the widest operating load conditions without changing the location of the control point with variations in load, and without the necessity of increasing the quantity of the injection water beyond a reasonable amount.

This according to the invention is accomplished by providing apparatus which makes it possible to choose a predetermined temperature versus load characteristic in connection with the temperature measured in a control tube, which characteristic can be so selected that the resulting control impulses received from the control tube satisfy the herein earlier recited primary requirement of: wide and constant control sensitivity, while maintaining quick control response and low percentage of injection water. All three of these desirable features of a satisfactory control system can now be obtained throughout a major operating load range. This is achieved, in accordance with the invention, by adjusting the flow through tube 60 independently of the flow through the remaining tubes 16 either by a throttling device such as 62 or by other conventional means such as a bypass (not shown). In this manner the control temperature at the control point 65 is brought within the desired temperature range for any given load. This load-adjusted temperature then serves as the control criterion or standard temperature, with any deviations therefrom for any given load being sensed by sensing device 64 at point 65 and being transmitted to feedwater power unit 49 for adjusting the feedwater flow into the generator.

The improved apparatus, which in accordance with the invention permits selection of any predetermined temperature versus load characteristic, will now be described.

As soon as a variation in load occurs on the turbine 34, such change is indicated by a change in pressure drop across the flow meter orifice 66 being provided in the steam line 32 leading to the turbine 34. This change in load is transmitted from flow meter 68 to load point setting device 69, which device by angular rotation in response to the load impulse is organized to adjust the positioning of two cams 70 and 71 mounted on a common rotating shaft. Two followers 72 and 73, respectively, are being urged against the contour of cams 70 and 71 by suitable devices such as springs, and establish for each respective load in each set point receiver 74 and 75 a corresponding standard control condition or set point. From the set point receiver 74 a desired set point signal is transmitted to the comparing device 63, wherein the standard temperature or set point impulse received from receiver 74 is compared with an actual temperature impulse received from temperature sensor 64. If the temperature at control point 65 as received by sensor 64 and compared at 63 with the set point temperature, is higher, the difference will initiate a control impulse to be received and acted on by power unit 49 to effect further opening of valve 50. If the temperature at 65 is lower than the set point temperature, the difference will cause a corresponding impulse to be received and acted on by power unit 49 to adjust the position of valve 50 in a closing direction.

Similarly from the set point receiver 75 another desired set point signal depending on the load is transmitted to the comparing device 76, wherein this set point signal is compared with an impulse received from temperature differentiating device 57. In this differentiating device the difference is established between the temperatures measured at control point 65 and that at 48 as indicated at ΔT in FIG. 1B. An impulse corresponding to this difference is then transmitted to comparing device 76 and balanced against the set point impulse received from device 75. If the impulse value received from device 57 is larger than the set point impulse value received from device 75, a signal is transmitted to valve actuator 78 to effect a reduction of the flow opening of valve 62. If the signal value received from device 57 is smaller than the load signal set point value received from device 75, then an impulse is being sent to valve actuator 78 which will operate valve 62 so as to increase the flow area thereof.

FIG. 1B shows temperatures at control points 48 and 65 being plotted against load. The desired difference ΔT between these temperatures as a function of load determines the contour that is characteristic of cam 71. For each of these temperature differences there exists a desired temperature at 65 which for each load can now selectively be located in a favorable region to satisfy the earlier named three desired control requirements.

In FIG. 1 the opening of valve 62 is regulated for varying loads in response to the difference of the temperature measured at 65 and that at 48 as earlier described herein. FIG. 5 on the other hand shows an embodiment wherein the positioning of valve 62 is directly related to the load and to the control temperature at point 65 through the contour of cam 71. Thus for each desired load determined control temperature at 65 a definite flow through control tube 60 or a definite opening of valve 62 is required.

A third embodiment shown in FIG. 4 makes use of the difference between the flow through conduit 30 and that through the control tube 60. For this purpose a pressure differential measured at and across an orifice plate or restriction 80 placed in conduit 30 gives an indication at 82 of the flow to evaporator tubes 16. And a pressure differential measured at and across an orifice plate or restriction 84 placed in control tube 60 gives an indication at 86 of the flow through tube 60. Variations in the difference Δf between these two flows as indicated in FIG. 4A and as determined by differentiating device 88 is compared in comparing device 90 with a set point signal received from set point receiver 75. If the actual flow difference is greater than that demanded by the set point signal a command will be transmitted to actuator or power unit 78 to open valve 62. And if the actual flow difference is smaller than that demanded by the set point a signal will be transmitted to actuator 78 to adjust valve 62 in a closing direction.

In this manner in accordance with the invention, any desirable relationship between the control temperature at point 65 and the various loads can be employed for controlling the feedwater flow at these various loads. Such temperature versus load relationship may preferably be one wherein the specific heat remains constant throughout the load range such as indicated by curves $E_1$, $E_2$, and $E_3$ of FIG. 2. These curves show constant specific heats of 3, 4, and 5, B.t.u. per pound degree F., respectively, throughout a major load range of the generator, and indicate the corresponding temperatures at various loads under these conditions. Or the desired temperature versus load relationship may be defined by a constant temperature relationship throughout a predetermined load range such as shown by curves $F_1$ and $F_2$ which indicate a constant temperature of 760 and 750 respectively. Other relationships may be employed to suit specific control conditions and to solve specific problems arising out of the operation in the supercritical pressure range. These specific conditions, for example, may be due to the particular pressure region within which a steam boiler is operating such as the region directly above the critical pressure point, or a region of operating pressure which is substantially removed therefrom. One such specific operating characteristic is illustratively shown by curve G in FIG. 2, which would combine both temperature as well as specific heat considerations.

From the above it can readily be appreciated that the invention offers great flexibility in meeting and solving feed-water control problems as they arise in the supercritical pressure range.

The temperature versus load relationship, or specific heat versus load relationship selected for each specific steam generator establishes the contour of cam 70 and that of cam 71. Such relationship generally is being determined during the design stage of the steam generator. If during operation it becomes advisable to alter the original characteristic of the feedwater flow control, such can easily be accomplished by substituting for the original cams 70 and 71 cams of a different contour which would correspond to the newly selected control relationship.

From the above it can readily be appreciated that the superior performance of the herein disclosed improved control apparatus and method for operating a steam generator in the supercritical pressure range springs from simultaneously fulfilling several important requirements for successful regulation of the feedwater supply. Such a high degree of satisfactory performance could heretofore not be achieved, since the control temperature at any given load heretofore was inherently determined by the design and also the operation of the steam generator at that load. As earlier set forth herein, these requirements include: locating the temperature sensing device and control point in the heating path so that temperature variations of wide magnitude are obtained with respect to corresponding heat input variations throughout the load range; locating the control point sufficiently close to the feedwater regulator so as to eliminate excessive lag in impulse response; and locating the control point so that only a reasonably low amount of injection water becomes necessary for the control of the superheated steam temperature at all loads.

The herein disclosed improved method and apparatus for regulating the fluid supply to a vapor generator operating in the supercritical pressure range fulfills the above requirements in a novel and superior manner, which manner offers great advantages in simplicity, flexibility and efficiency in the control and operation of a vapor generator.

While we have illustrated and described a preferred embodiment of our invention it is to be understood that such is merely illustrative and not restrictive and that variations and modifications may be made therein witthout departing from the spirit and scope of the invention. We therefore do not wish to be limited to the precise details set forth but desire to avail ourselves of such changes as fall within the purview of our invention.

We claim:

1. In a vapor power plant comprising a forced once through flow boiler producing superheated vapor at supercritical pressure and at variable vapor output by absorption of heat from a stream of combustion gases, a system for regulating the supply of the working fluid in accordance with the vapor output required by varying operating conditions of the plant, said system comprising in combination:
   (a) means for flowing a major quantity of the working fluid in first heat exchange relation with said stream of combustion gases, to raise the temperature of the fluid to a predetermined vapor outlet temperature;
   (b) means for flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
   (c) means for establishing a desired first relationship between said control temperature and any given vapor output;
   (d) means for establishing a desired second relationship between said control temperature and said vapor output temperature for any given vapor output;
   (e) means for regulating the flow rate of said control fluid quantity in response to said second relationship to maintain the temperature thereof at said predetermined control vapor temperature; and
   (f) means for regulating the fluid flow rate of said major working fluid quantity in response to said control temperature as maintained by said control temperature versus vapor output temperature second relationship.

2. In a vapor power plant comprising a forced once through flow boiler producing superheated vapor at supercritical pressure and at variable vapor output by absorption of heat from a stream of combustion gases, a system for regulating the supply of the working fluid in accordance with the vapor output required by varying operating conditions of the plant, said system comprising in combination:
   (a) means for flowing a major quantity of the working fluid in first heat exchange relation with said stream of combustion gases;
   (b) means for flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
   (c) means for establishing a desired first relationship between said control temperature and any given vapor output;
   (d) means for establishing a desired second relationship between said control quantity flow rate and said major quantity flow rate for any given vapor output;
   (e) means for regulating the flow rate of said control fluid quantity in response to said second relationship to maintain the temperature thereof at said predetermined control vapor temperature; and
   (f) means for regulating the fluid flow rate of said major quantity of working fluid in response to said control temperature as maintained by said second relationship between control quantity flow rate and major quantity flow rate.

3. In a vapor power plant comprising a forced once through flow boiler producing superheated vapor at supercritical pressure and at variable vapor output by absorption of heat from a stream of combustion gases, a system for regulating the supply of the working fluid in accordance with the vapor output required by varying operating conditions of the plant, said system comprising in combination:
   (a) means for flowing a major quantity of the working fluid in first heat exchange relation with said stream of combustion gases;
   (b) means for flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
   (c) means for establishing a desired first relationship between said control temperature and any given vapor output;
   (d) means for establishing a desired second relationship between said control temperature and the flow rate of said control quantity of any given vapor output;
   (e) means for regulating the flow rate of said control fluid quantity in response to said second relationship to maintain the temperature thereof at said predetermined control vapor temperature; and
   (f) means for regulating the fluid flow rate of said major working fluid quantity in response to said control temperature as maintained by said second relationship.

4. In a vapor power plant comprising a forced once through flow boiler producing superheated vapor at supercritical pressure and at variable vapor output by absorption of heat from a stream of combustion gases, a system for regulating the supply of the working fluid in accordance with the vapor output required by varying operating conditions of the plant, said system comprising in combination:
   (a) means for flowing a major quantity of the working fluid in first heat exchange relation with said stream of combustion gases to raise the temperature of the fluid to a predetermined vapor outlet temperature;
   (b) means for flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
   (c) means for establishing a desired first relationship between said control temperature and any given vapor output;
(d) means for establishing a desired second relationship between an operating characteristic of said control quantity and an operating characteristic of said major quantity for any given vapor output;
(e) means for regulating the flow rate of said control fluid quantity in response to said second relationship to maintain the temperature thereof at said predetermined control vapor temperature; and
(f) means for regulating the fluid flow rate of said major working fluid quantity in response to said control temperature as maintained by said second relationship between the operating characteristic of said control quantity and the operating characteristic of said major quantity for any given vapor output.

5. In a vapor power plant comprising a forced once through flow boiler producing superheated vapor at supercritical pressure and at variable vapor output by absorption of heat from a stream of combustion gases, the method of regulating the supply of the working fluid in accordance with the vapor output required by varying operating conditions of the plant, said method comprising the steps of:
(a) flowing a major quantity of the working fluid in first heat exchange relation with said stream of combustion gases, to raise the temperature of the fluid to a predetermined vapor outlet temperature;
(b) flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
(c) establishing a desired first relationship between said control temperature and any given vapor output;
(d) establishing a desired second relationship between said control temperature and said vapor output temperature for any given vapor output;
(e) regulating the flow rate of said control fluid quantity in response to said second relationship to maintain the temperature thereof at said predetermined control vapor temperature; and
(f) regulating the fluid flow rate of said major working fluid quantity in response to said control temperature as maintained by said control temperature versus vapor output temperature second relationship.

6. In a vapor power plant comprising a forced once through flow boiler producing superheated vapor at supercritical pressure and at variable vapor output by absorption of heat from a stream of combustion gases, the method of regulating the supply of the working fluid in accordance with the vapor output required by varying operating conditions of the plant, said method comprising the steps of:
(a) flowing a major quantity of the working fluid in first heat exchange relation with said stream of combustion gases;
(b) flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
(c) establishing a desired first relationship between said control temperature and any given vapor output;
(d) establishing a desired second relationship between said control quantity flow rate and said major quantity flow rate for any given vapor output;
(e) regulating the flow rate of said control fluid quantity in response to said second relationship to maintain the temperature thereof at said predetermined control vapor temperature; and
(f) regulating the fluid flow rate of said major quantity of working fluid in response to said control temperature as maintained by said second relationship i.e. between control quantity flow rate and major quantity flow rate.

7. In a vapor power plant comprising a forced once through flow boiler producing superheated vapor at supercritical pressure and at variable vapor output by absorption of heat from a stream of combustion gases, the method of regulating the supply of the working fluid in accordance with the vapor output required by varying operating conditions of the plant, said method comprising the steps of:
(a) flowing a major quantity of the working fluid in first heat exchange relation with said stream of combustion gases;
(b) flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
(c) establishing a desired first relationship between said control temperature and any given vapor output;
(d) establishing a desired second relationship between said control temperature and the flow rate of said control quantity for any given vapor output;
(e) regulating the flow rate of said control fluid quantity in response to said second relationship to maintain the temperature thereof at said predetermined control vapor temperature; and
(f) regulating the fluid flow rate of said major working fluid quantity in response to said control temperature as maintained by said second relationship.

8. In a vapor power plant comprising a forced once through flow boiler producing superheated vapor at supercritical pressure and at variable vapor output by absorption of heat from a stream of combustion gases, the method of regulating the supply of the working fluid in accordance with the vapor output required by varying operating conditions of the plant, said method comprising the steps of:
(a) flowing a major quantity of the working fluid in first heat exchange relation with said stream of combustion gases to raise the temperature of the fluid to a predetermined vapor outlet temperature;
(b) flowing a minor control quantity of the working fluid in second heat exchange relation with said stream of combustion gases and in parallel flow relation with said major quantity of working fluid, to raise the temperature of said control fluid quantity to a predetermined control vapor temperature that is related to said vapor output;
(c) establishing a desired first relationship between said control temperature and any given vapor output;
(d) establishing a desired second relationship between an operating characteristic of said control quantity and an operating characteristic of said major quantity for any given vapor output;
(e) regulating the flow rate of said control fluid quantity in response to said second relationship to maintain the temperature thereof at said predetermined control vapor temperature; and
(f) regulating the fluid flow rate of said major quantity of working fluid in response to said control temperature as maintained by said second relationship between the operating characteristic of said control quantity and the operating characteristic of said major quantity for any given vapor output.

References Cited by the Examiner

UNITED STATES PATENTS

| | | | |
|---|---|---|---|
| 2,113,833 | 4/38 | Eule. | |
| 2,126,248 | 8/38 | Eule | 122—448 |
| 3,086,504 | 4/63 | Profos | 122—451 |
| 3,092,086 | 6/63 | Profos | 122—451.1 |
| 3,133,529 | 5/64 | Wessely | 122—479 |

FOREIGN PATENTS 809,287    2/59    Great Britain.

OTHER REFERENCES

Eule: German printed application No. 7776 Ia/13g, printed 8/56.

Heim: German printed application No. 1,015,977, 9/57.

PERCY L. PATRICK, *Primary Examiner.*

KENNETH W. SPRAGUE, *Examiner.*